United States Patent [19]
Arakawa et al.

[11] Patent Number: 5,521,779
[45] Date of Patent: May 28, 1996

[54] ROTARY MAGNETIC HEAD APPARATUS WHICH INCLUDES A DEVICE FOR ELECTRICALLY CONNECTING A CIRCUIT BOARD, A ROTOR, AND MAGNETIC HEADS

[75] Inventors: Masayuki Arakawa; Masao Segawa, both of Kanagawa-ken; Makoto Takagi, Shizuoka-ken, all of Japan

[73] Assignee: Kabushiki Kaisha Toshiba, Kawasaki, Japan

[21] Appl. No.: 453,996

[22] Filed: May 30, 1995

Related U.S. Application Data

[63] Continuation of Ser. No. 156,783, Nov. 24, 1993, abandoned.

[30] Foreign Application Priority Data

Nov. 25, 1992 [JP] Japan ................................ 4-314897
Jun. 21, 1993 [JP] Japan ................................ 5-148962

[51] Int. Cl.⁶ ............................. G11B 5/53; G11B 21/18
[52] U.S. Cl. .................................. 360/108; 360/104
[58] Field of Search ........................ 360/84, 104, 108, 360/130.24, 85, 95

[56] References Cited

U.S. PATENT DOCUMENTS

| | | | |
|---|---|---|---|
| 4,835,645 | 5/1989 | Ohji et al. | 360/108 |
| 5,010,432 | 4/1991 | Fukushima et al. | 360/108 |
| 5,023,734 | 6/1991 | Tamaki | 360/84 |
| 5,070,424 | 12/1991 | Ono et al. | 360/108 |
| 5,317,466 | 5/1994 | Hasegawa | 360/84 |
| 5,321,569 | 6/1994 | Sakai | 360/108 |
| 5,325,248 | 6/1994 | Tabuchi et al. | 360/108 |
| 5,363,263 | 11/1994 | Ohji et al. | 360/108 |

FOREIGN PATENT DOCUMENTS

| | | | |
|---|---|---|---|
| 0398812 | 11/1990 | European Pat. Off. | |
| 60-40503 | 3/1985 | Japan | 360/108 |
| 62-173605 | 7/1987 | Japan | 360/110 |
| 63-74101 | 4/1988 | Japan . | |
| 3194718 | 8/1991 | Japan . | |

*Primary Examiner*—Stuart S. Levy
*Assistant Examiner*—Jefferson Evans
*Attorney, Agent, or Firm*—Cushman Darby & Cushman

[57] ABSTRACT

A rotary magnetic head apparatus according to one aspect of the invention has magnetic heads mounted on a rotary drum, a rotor which rotates together with the rotary drum and a circuit board with electronic circuits formed thereon provided between the rotor and the magnetic heads. While a connecting device according to another aspect of the invention has at least one spring contact and outer lead terminals extending in at least three directions and a resin mold body for fixing them together in a body, and the lead terminal extending in one direction is electrically connected with the spring contact while the remaining two terminals extending in other directions are electrically connected to each other in the resin mold body.

2 Claims, 7 Drawing Sheets

ROTARY MAGNETIC HEAD APPARATUS WHICH INCLUDES A DEVICE FOR ELECTRICALLY CONNECTING A CIRCUIT BOARD, A ROTOR, AND MAGNETIC HEADS

This is a continuation of application Ser. No. 08/156,783, filed on Nov. 24, 1993, now abandoned.

FIELD OF THE INVENTION

The present invention relates generally to a rotary magnetic head apparatus and a connecting device for constructing the apparatus.

BACKGROUND OF THE INVENTION

In recent years there has been an increased demand to improve, rotary magnetic head apparatus used in, e.g., VTRs. Such improvements included miniaturization, reduction of weight, providing a multiplication of magnetic heads, broadening of frequency band, etc. Also the rotary magnetic head apparatus has been demanded to house, e.g., an amplifier circuit therein.

FIG. 1 is a longitudinal section of a conventional rotary magnetic head apparatus, and FIG. 2 is an exploded prespective view of the conventional rotary magnetic head apparatus. In FIGS. 1 and 2, 21 denotes a rotary drum. To this rotary drum 21 a magnetic head 22 is fastened with screws 23. A rotor 24a of a rotary transformer 24 is fixed to a flange 26 with, e.g., a bonding agent, into which a rotary shaft 25 is inserted. This flange 26 is fastened to the rotary drum 21 with screws. A junction board 27, which is made of epoxy resin, is mounted on the rotor 24a. A winding 28 of the rotor 24a is connected by soldering to the junction board 27. Further, a plurality of first connecting terminals 29 insulated by, e.g., a resin mold are mounted by soldering to the junction board 27 so as to penetrate the rotary drum 21. The winding 28 and the first connecting terminals 29 are electrically connected to each other through the junction board 27. A circuit board 30 provided with electric circuits such as recording and reproducing signal amplifier circuits, mounted on the rotary drum 21, is connected by soldering to the first connecting terminals 29. The magnetic heads 22 and the circuit board 30 are connected by soldering to the second connecting terminals 31, which are insulated with a resin mold and penetrates the rotary drum 21. Further, the rotary shaft 25 of the rotary drum 21 is inserted into a rotary bearing 33 fitted in an inserting hole of the stationary drum 32, to which a stator 24b of the rotary transformer 24 is bonded. The rotary magnetic head apparatus is thus constructed as described above.

However, in the construction as described above, by increasing the number of connections, the electric characteristic degrades. Further the manufacturing process is complicated because dedicated connecting terminals 29 and 31 were needed for connecting the rotor 24a, the magnetic heads 22 and the circuit board 30.

Also as a construction of an electronic circuit on the rotor 24a requires making the rotor 24a large, the magnetic heads 22 will be concealed by the rotor 24a. Therefore, the magnetic heads 22 could not be connected to the circuit board 30. Further, the circuit board 30 positioned outside the rotary drum 21 was unfavorable for achieving the broadening of the frequency band of recording signals.

In a conventional rotary magnetic head apparatus, dedicated connecting terminals were needed for connecting the rotor, the magnetic heads and the rotary board. Furthermore, increasing the number of connecting points, electric characteristic decreases, and the manufacturing process was complicated.

FIG. 3 shows a conventional connecting device for connecting circuit boards when assembling the rotary magnetic head apparatus. FIG. 3(a) shows a male connector unit. This male connector unit is comprised of a resin mold body 131, male connectors 132, and lead terminals 133. This male connector unit is connected by soldering using the lead terminals 133. This male connector unit is connected by soldering using the lead terminals 133 to connecting pads 135 formed on a circuit board 134.

FIG. 3(b) shows a female connector unit. This female connector unit is comprised of a resin mold body 136, female connectors 137, and lead terminals 138. Similar to the male connector unit, this female connector unit is connected by soldering using the lead terminals 138 to connecting pads 140 formed on a circuit board 139. By inserting the male connectors 132 into the female connectors 137, the circuit boards 134 and 139 can be electrically connected to each other.

In the connecting device constructed as described above, a dead space on the circuit board was large and a mounting strength to the circuit board was also not sufficient enough.

However, as the first and the second connecting devices 29 and 31 of the conventional apparatus shown in FIG. 1 are very large in size, they require soldering processes for electrical connections to magnetic heads and a rotor, the manufacturing processes are complicated. Further, a spring contact type connecting device 154, as shown in FIG. 4, were conceived by the inventors as a substitute for the first connecting device 149. However, these spring contact type connecting devices 154 are also required to penetrate the rotary drum 141, so that a space on the rotary drum 141 for providing a connecting device for connecting the circuit boards 134, 139 and the magnetic heads has been lost. Further, when it is attempted to house a circuit board 150 in the rotary drum 141, it was extremely difficult for such connecting devices as described above to electrically connect the magnetic heads and the rotary transformer to the circuit boards 134, 139.

In the conventional connecting devices used in the rotary magnetic head apparatus, its connecting method was complicated, and furthermore the connecting device itself was large in size so that it was very difficult to house a circuit board in a rotary drum, and a dead space on a circuit board was large and a mounting strength to a circuit board was also insufficient.

SUMMARY OF THE INVENTION

It is, therefore, an object of the present invention to provide a rotary magnetic head apparatus which is able to make it easy to connect magnetic heads with a circuit board.

Another object of the present invention is to provide a rotary magnetic head apparatus which is able to improve its electric characteristic.

Still another object of the present invention is to provide a rotary magnetic head apparatus which is able to make the manufacturing process simple and easy.

Further object of the present invention is to provide a connecting device which is small in size and has a sufficient mountability and mounting strength to a circuit board, in assembling a rotary magnetic head apparatus.

Still further object of the present invention is to provide a connecting device which is simple and stable in connection with other circuit boards and capable of effectively utilizing a mounting space on a circuit board, in assembling a rotary magnetic head apparatus.

In order to achieve the object described above, the rotary magnetic head apparatus according to the first aspect of the present invention is comprised of magnetic heads mounted on a rotary drum, a rotor which rotates together with the rotary drum and a circuit board with electronic circuits formed thereon provided between the rotor and the magnetic heads.

According to the first aspect of the present invention, the rotary magnetic head apparatus is able to maintain an electric characteristic at a satisfactory level. Thus there no needed for dedicated connecting terminals, which makes the manufacturing process simple and easy by locating a circuit board with electronic circuits formed thereon between the rotor and the magnetic heads and further, by a directly connecting the magnetic heads, the rotor and the circuit board by the spring contacts provided on the circuit board.

In order to achieve the objects as described above, the connecting device for constructing a rotary magnetic head apparatus according to the second aspect of the present invention has at least one spring contact and outer lead terminals extending in at least three directions and a resin mold body for fixing them together in a body, and the lead terminal extending in one direction is electrically connected with the spring contact while the remaining two terminals extending in other directions are electrically connected to each other in the resin mold body.

According to the the second aspect of the present invention, it is possible to provide a connecting device which is small in size, and has sufficient mountability and a mounting strength to a circuit board, and is simple and stable in connection with, e.g., other circuit boards, and is capable of effectively utilizing a mounting space on a circuit board.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to FIGS. 5 through 8, a rotary magnetic head apparatus according to a first embodiment of the present invention will be described in detail.

Figure 5:
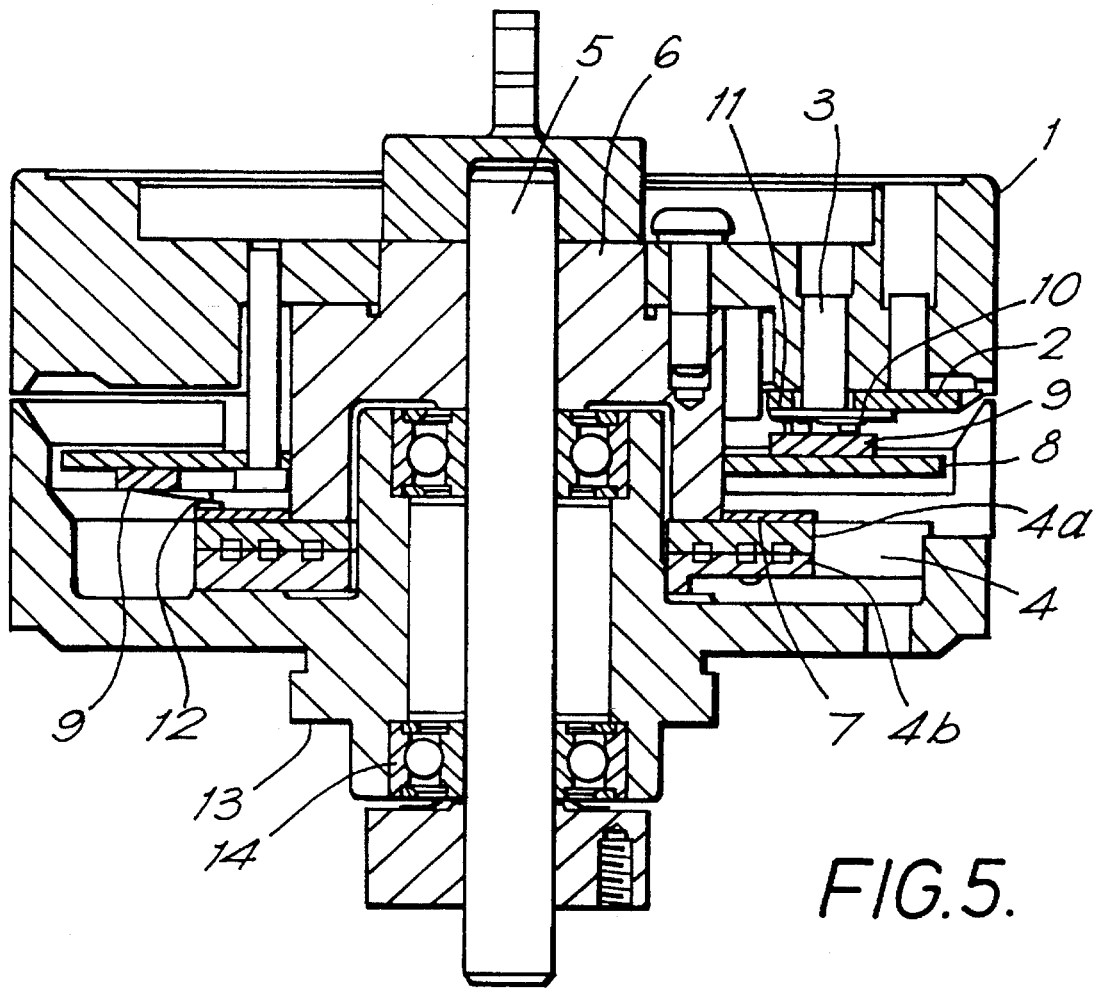
FIG. 5 is a cross-sectional view of the rotary magnetic head in a preferred embodiment of the present invention.
Figure 6:
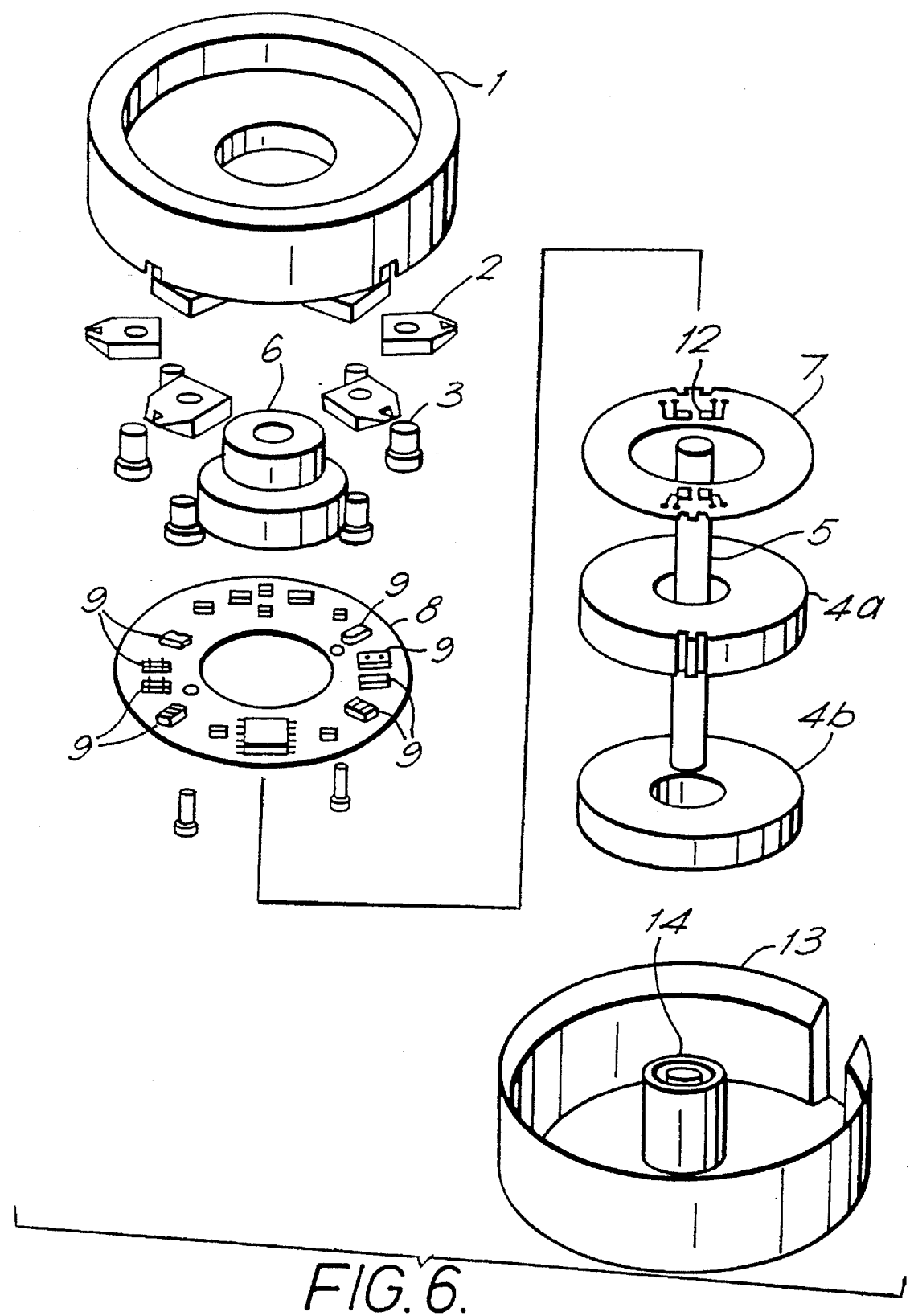
FIG. 6 is an exploded perspective view of the rotary magnetic head apparatus in the preferred embodiment of the present invention.

FIG. 5 is a cross-sectional view of the rotary magnetic head apparatus according to the first embodiment of the present invention. FIG. 6 is an exploded perspective view of the rotary magnetic head apparatus according to the first embodiment of the present invention.

Figure 1:
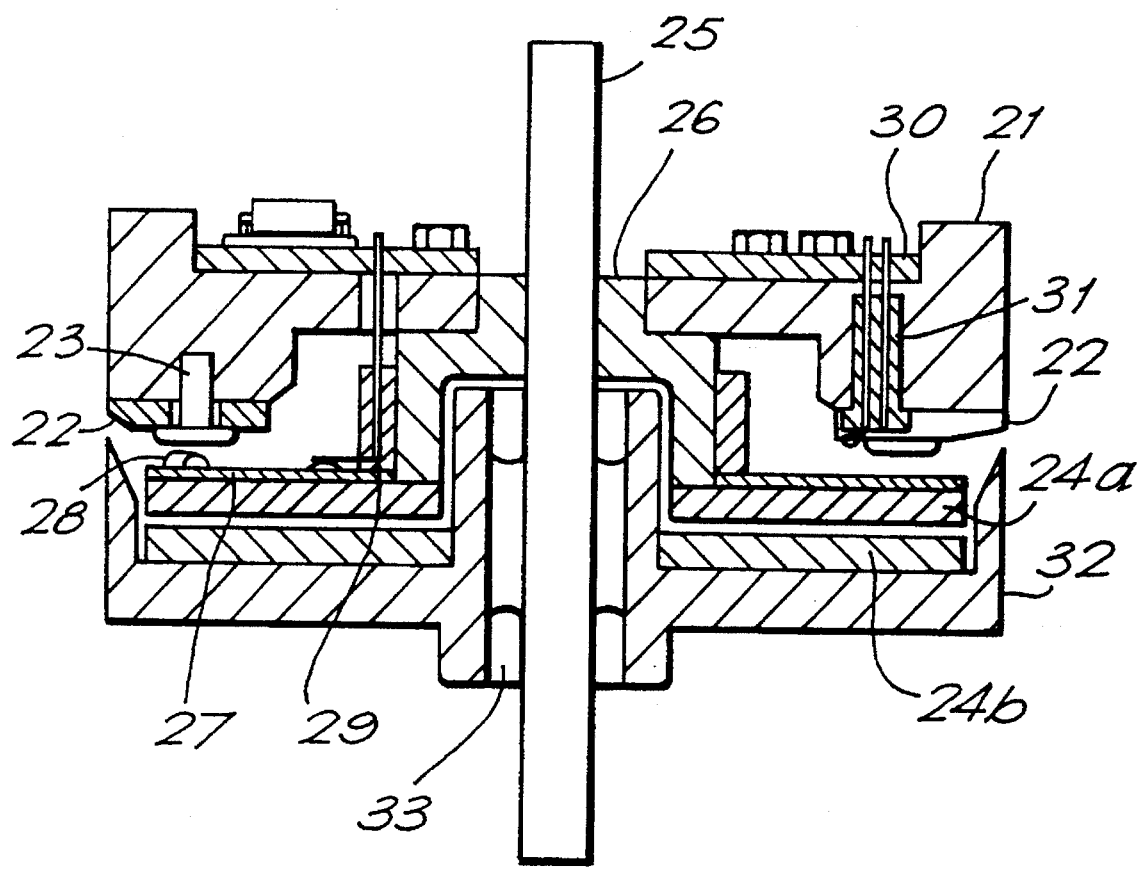
FIG. 1 is a cross-sectional view of a conventional rotary magnetic head apparatus.
Figure 2:
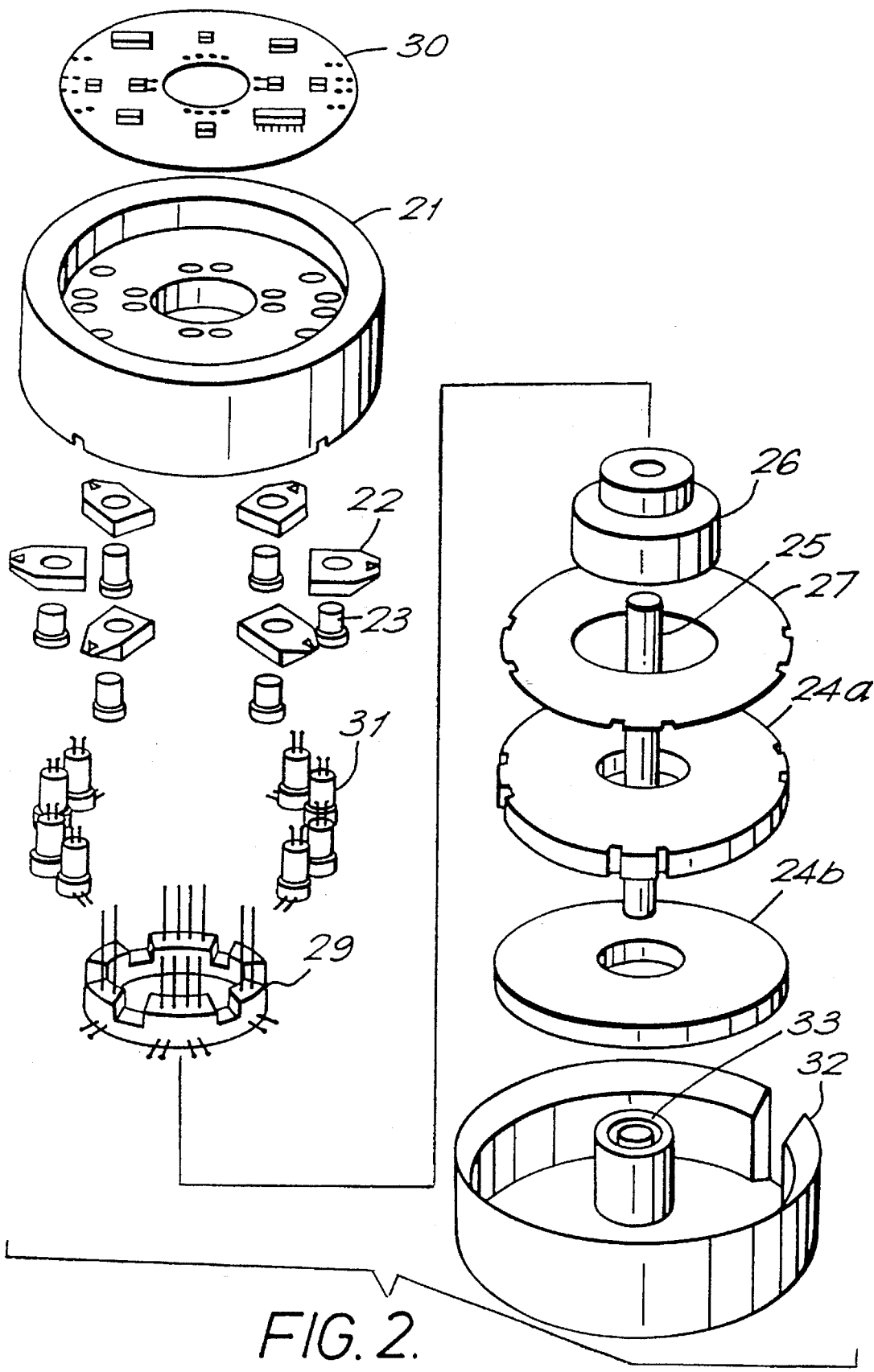
FIG. 2 is an exploded perspective view of a conventional rotary magnetic head apparatus.
Figure 3A:
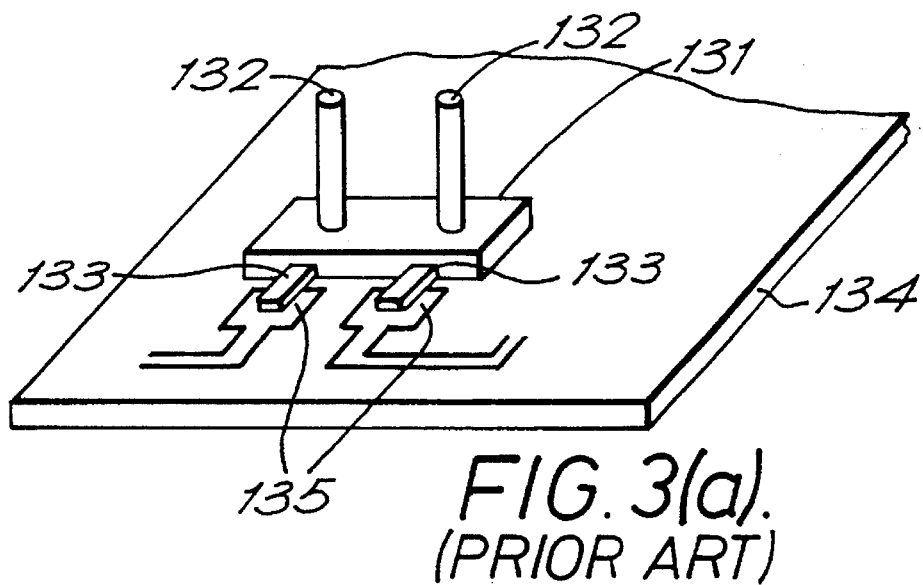
FIGS. 3(a) and 3(b) is a perspective view of a conventional connecting device.
Figure 3B:
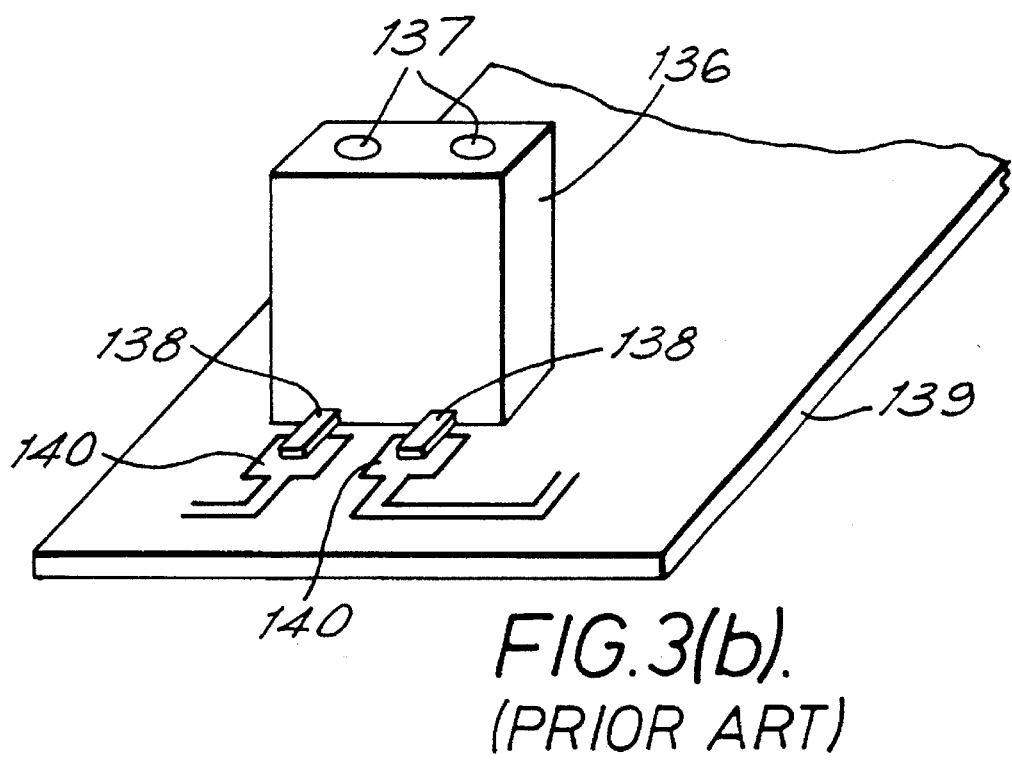
Figure 4:
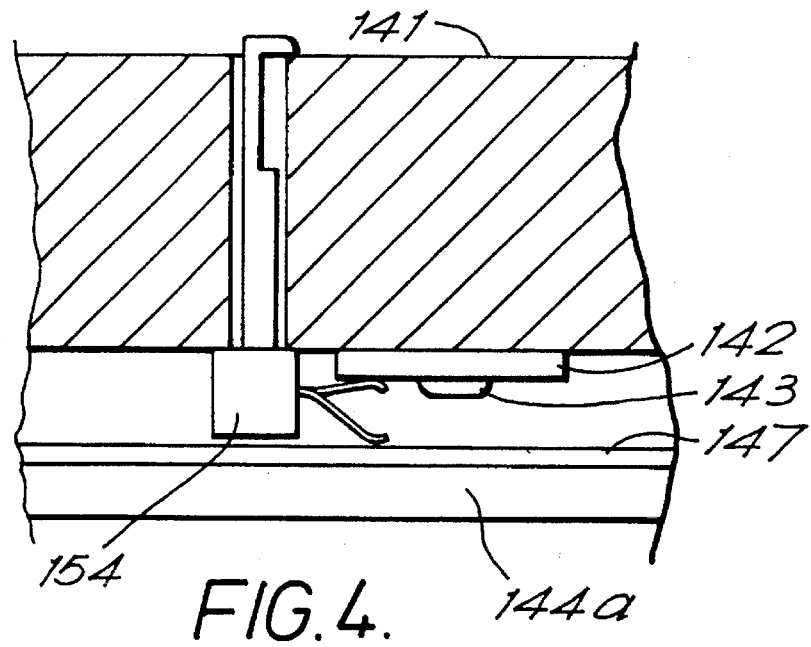
FIG. 4 is a cross-sectional view of a conventional rotary magnetic head recording/reproducing apparatus.

In FIGS. 5 and 6, 1 denotes a rotary drum. To this rotary drum 1 magnetic heads 2 are fastened with screws 3. A rotor 4a of a rotary transformer 4 is fixed to a flange 6 into which a rotary shaft 5 is inserted and fixed by, e.g., bonding agent, and the flange 6 is fastened to the rotary drum 1 with screws. Further, a wiring board 7 which is electrically connected to a rotor coil is mounted on the rotor 4a. A ring-shaped epoxy resin circuit board 8 with electronic circuits as illustrated in the diagram shown in FIG. 7 formed thereon is provided between the magnetic heads 2 and the wiring board 7 on the rotor 4a. This circuit board 8 is fixed to the rotary drum 6 with fastening screws.

Figure 7:
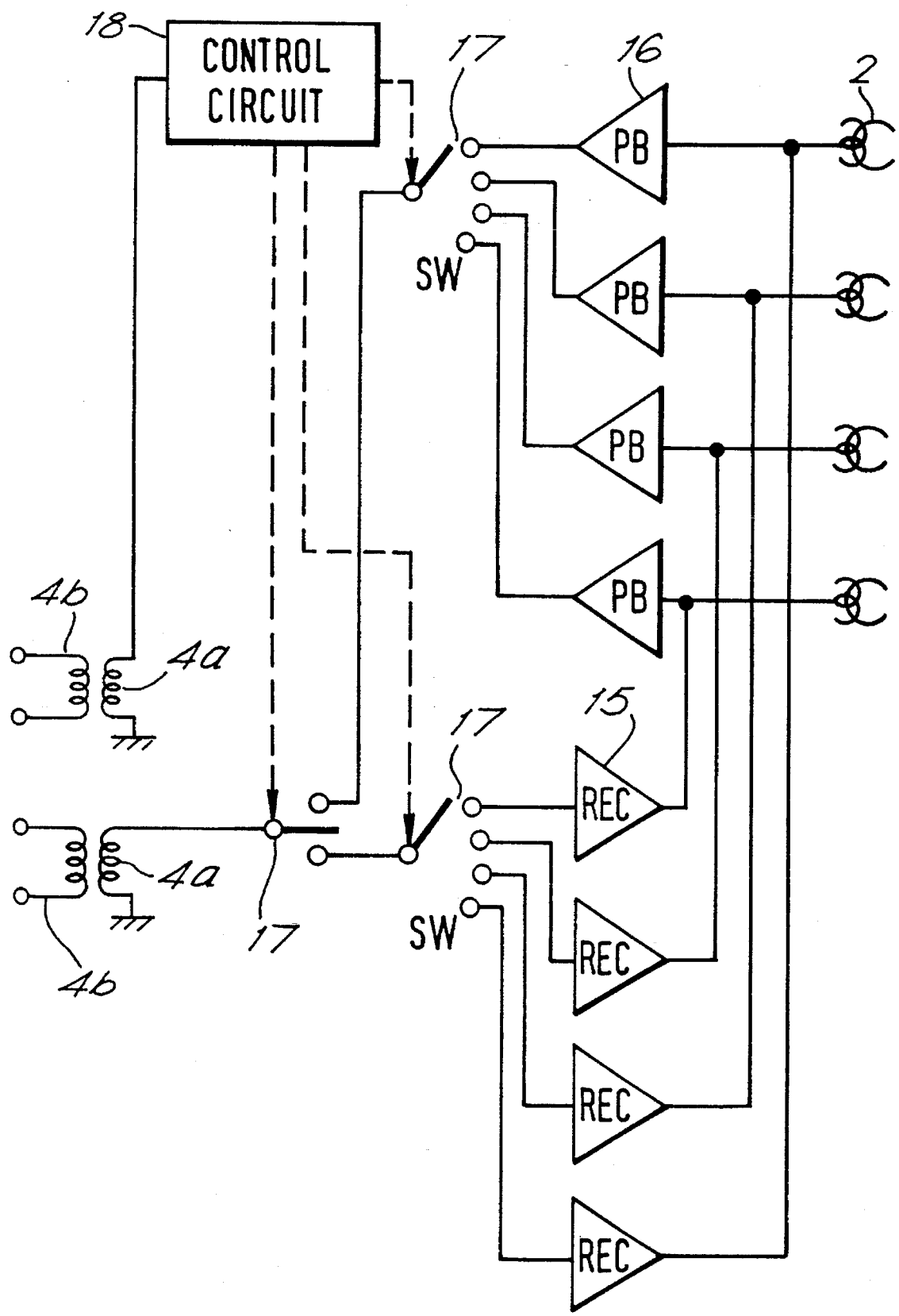
FIG. 7 is a diagram showing the electronic circuit in the preferred embodiment of the present invention.

In FIG. 7, 2 shows magnetic heads which run on a magnetic tape (not shown) for recording/reproducing signals, 15 shows an amplifier circuit for amplifying recorded signals and 16 shows an amplifier circuit for amplifying reproduced signals. 17 shows switches for selecting signal recording/reproducing by respective magnetic heads and 18 is a control circuit of the switches 17. Using the electronic circuits illustrated in FIG. 7, it is possible to sharply reduce the number of transmission channels of the rotary transformer 4 which were so far needed in the same quantity as the magnetic heads and to obtain the rotary transformer 4 smaller in diameter than conventional rotary transformers.

As shown in FIGS. 5 and 6, spring contacts 9 are mounted on the circuit board 8 for electrically connecting the magnetic heads 2 and the wiping board 7 on the rotor 4a.

Figure 8A:
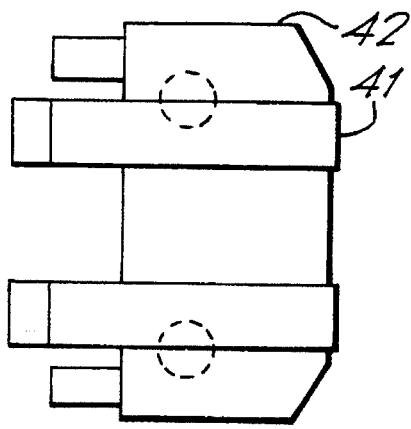
FIGS. 8(a) and 8(b) is a plan and a side view of the spring contact in the preferred embodiment of the present invention.
Figure 8B:
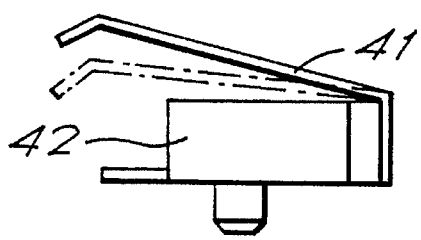

FIGS. 8(a) and 8(b) are diagrams showing the plan view and the side view of this spring contact 9, respectively. As shown in these drawings, each of the spring contacts 9 is comprised of a leaf spring 41 which functions as a connecting terminal and a resin mold body 42, and the spring contacts 9 are mounted by soldering to the circuit board together with other electronic parts. The spring contacts 9 constructed as described above are pressure-contacted to connecting pads 11 formed on a wiring board 10 mounted on the magnetic heads 2 and connecting pads 12 formed on a wiring board 7 mounted on the rotor 4a, when assembling the rotary magnetic head apparatus. Thus, they are electrically connected to each other.

Next, as shown in FIG. 5, the rotary shaft 6 of the rotary drum side is inserted into an inserting hole into which a rotary bearing 14 of a stationary drum 13 with the stator 4b of the rotary transformer 4 bonded is inserted. The rotary magnetic head recording/reproducing apparatus is thus constructed.

As described above, the ring-shaped circuit board 8 with electronic circuits such as recording signal/reproducing signal amplifier circuits formed thereon is provided between the rotor 4a of the rotary transformer 4 and the magnetic heads 2, while connections of the circuit board 8, the rotor 4a and the magnetic heads 2 are achieved by pressure-contacting the spring contacts 9 provided on the circuit board 8 to the connecting pads 12 of the wiring board 7 located on the rotor 4a and the connecting pads 11 of the wiring board 10 located on the magnetic heads 2, when assembling the rotary magnetic head apparatus.

Further, because both sides of the circuit board 8 can be provided for wirings, a large space sufficient enough for mounting recording/reproducing signal amplifier circuits can be obtained. This will allow the direct connections of the rotor 4a, the magnetic heads 2 and the circuit board 8 as a transmission pass can be made short, thus eliminating the necessity for dedicated connecting terminals, making its manufacturing process simple and easy, and improving electrical characteristics.

Hereinafter, a connecting device for use in the rotary magnetic head apparatus according to the second embodiment of the present invention will be described with reference to the drawings.

Figure 9A:
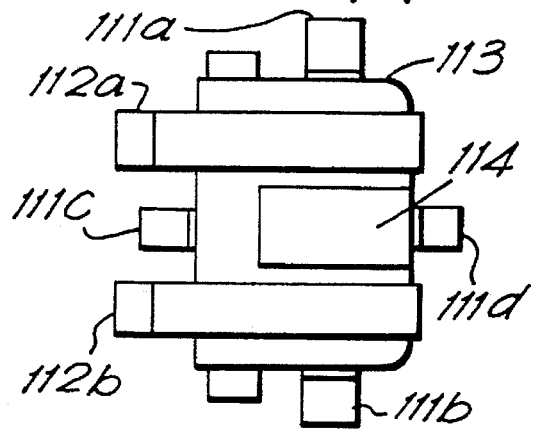
FIGS. 9(a), 9(b) and 9(c) show a plan view, a side view and a bottom view of the connecting device according to the preferred embodiment of the present invention.
Figure 9B:
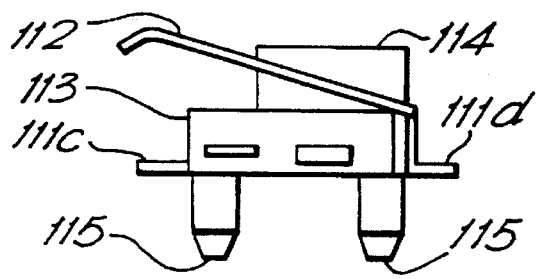
Figure 9C:
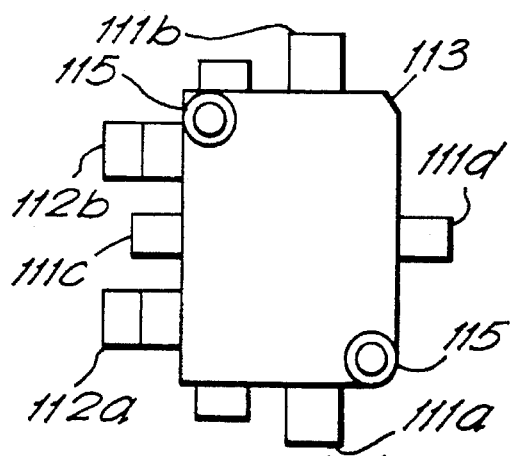

FIGS. 9(a), 9(b) and 9(c) illustrate a connecting device according to the second embodiment of the present invention. FIG. 9(a), FIG. 9(b) and FIG. 9(c) show the plan view, the side view and the bottom view of the connecting device, respectively. In FIGS. 9(a), 9(b) and 9(c), 111a through 111d denote lead terminals to be mounted on a circuit board. As these lead terminals 111a through 111d extend in four directions, the connecting device can be mounted stably on the circuit board. As all the lead terminals 111a through 111d are connected by soldering to the circuit board, the mounting strength of the connecting device is sufficient enough. The lead terminals 111a and 111b are electrically connected to spring contacts 112a and 112b in a resin mold body 113, respectively. These lead terminals 111a and 111b are used for a connection between circuit boards or between circuit boards and parts. The remaining lead terminals 111c and 111d are mutually connected in the resin mold body 113 and are usable as a jumper crossing over another wiring on the circuit board. Thus a space on the circuit board on which the connecting device is mounted can be used effectively.

In FIGS. 9(a), 9(b) and 9(c), 113 denotes the resin mold body. On the resin mold body 113, a projection 114 which is not interferring with a spring contact 112 is provided. When mounting the connecting device to a circuit board, the connecting device becomes possible to be mounted by picking up this projection 114 by a vacuum tool in an automatic mounting process without being interfered by the spring contact 112. This projection 114 is formed at a prescribed height from the resin mold body 113 so that the projection 114 functions as a limiter to prevent an application of an excessive pressure when the spring contact 112 is pressure-contacted to, e.g., another circuit board so that a stable contact pressure can be obtained. 115 denotes bosses for positioning the connecting device on the circuit board so that the connecting device can be precisely mounted thereon. The bosses 115 are able to be inserted in holes defined in the circuit board.

Referring now again to FIG. 5, a rotary magnetic head apparatus using the preferred embodiment of connecting device according to the present invention will be described.

As shown in FIG. 5, the connecting devices 9 according to the present invention are mounted on the circuit board 8 for connecting the magnetic heads 2 with the wiring board 7. Thus each of the connecting devices is pressure-contacted to each of the magnetic heads 2 and the wiring board 7 for electrically connecting them with each other when assembling the rotary magnetic head apparatus. The rotary shaft 5 of the rotary drum 1 is inserted into the rotary bearing fitted in the inserting hole of the stationary drum 13 on which the stator 4b of the rotary transformer 4 is provided. The rotary magnetic head apparatus is thus constructed as described above.

As described above, according to this second embodiment of the present invention, the connections among the rotor, the magnetic heads and the circuit board of the rotary magnetic head apparatus can be easily achieved. Furthermore, as processes such as solderings are not required in the connections using the connecting device, the manufacturing process will become simple and a rotary head magnetic recording/reproducing apparatus containing an electronic circuit, excellent in electric characteristic can be obtained.

As described above, according to the first embodiment of the present invention, the rotary magnetic head apparatus is possible to keep its electric characteristic at a satisfactory level, and also it is able to eliminate the necessity for dedicated connecting terminals and thus make its manufacturing process simple and easy by providing a circuit board with electronic circuits formed thereon between the rotor and the magnetic heads and by directly connecting the magnetic heads, the rotor and the circuit board with the spring contacts provided on the circuit board.

As described above, according to the second embodiment of the present invention, the connecting device is able to achieve a small-sized rotary magnetic head apparatus which is excellent in a mountability and a mounting strength to a circuit board, simple and stable in connection with, e.g., other circuit boards, and capable of effectively utilizing a mounting space on a circuit board.

As described above, the present invention can provide an extremely preferable rotary magnetic head apparatus as well as a connecting device for constructing the rotary magnetic head apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A rotary magnetic head apparatus comprising:

a rotary drum, a plurality of magnetic heads mounted on said rotary drum, a rotor which rotates together with said rotary drum, and a circuit board having electric circuits thereon for recording and reproducing signals, said circuit board being disposed between said rotor and said magnetic heads, said magnetic heads and said rotor having connecting pads and said circuit board having spring contacts fixed on opposing sides thereof for electrically connecting said magnetic heads, said circuit board and said rotor.

2. The apparatus according to claim 1, wherein said spring contacts comprise leaf springs.

* * * * *